(12) United States Patent
Jeong et al.

(10) Patent No.: US 10,044,029 B2
(45) Date of Patent: Aug. 7, 2018

(54) SECONDARY BATTERY (71) Applicant: LG Chem, Ltd., Seoul (KR)

(72) Inventors: Won Hee Jeong, Daejeon (KR); Min Sun Cho, Daejeon (KR); Sin Kyu Kim, Daejeon (KR); Min Hee Lee, Daejeon (KR); Seung Ryul Choi, Daejeon (KR); Jae Hyun Lee, Daejeon (KR); Geun Chang Chung, Daejeon (KR)

(73) Assignee: LG Chem, Ltd. (KR)

( * ) Notice: Subject to any disclaimer, the term of this patent is extended or adjusted under 35 U.S.C. 154(b) by 277 days.

(21) Appl. No.: 14/766,314

(22) PCT Filed: Jun. 5, 2014

(86) PCT No.: PCT/KR2014/004986
§ 371 (c)(1),
(2) Date: Aug. 6, 2015

(87) PCT Pub. No.: WO2014/196816
PCT Pub. Date: Dec. 11, 2014

(65) Prior Publication Data
US 2016/0099462 A1    Apr. 7, 2016

(30) Foreign Application Priority Data
Jun. 5, 2013   (KR) .................. 10-2013-0064421

(51) Int. Cl.
*H01M 4/36* (2006.01)
*H01M 4/525* (2010.01)
*H01M 10/052* (2010.01)
*H01M 4/505* (2010.01)
*H01M 4/58* (2010.01)
*H01M 4/587* (2010.01)
*H01M 4/62* (2006.01)
*H01M 10/0525* (2010.01)
*H01M 10/42* (2006.01)

(52) U.S. Cl.
CPC ........... *H01M 4/364* (2013.01); *H01M 4/366* (2013.01); *H01M 4/505* (2013.01); *H01M 4/525* (2013.01); *H01M 4/587* (2013.01); *H01M 4/5825* (2013.01); *H01M 4/625* (2013.01); *H01M 10/052* (2013.01); *H01M 10/0525* (2013.01); *H01M 2010/4292* (2013.01); *H01M 2220/20* (2013.01); *Y02T 10/7011* (2013.01)

(58) Field of Classification Search
CPC ...... H01M 4/364; H01M 4/366; H01M 4/525; H01M 4/505; H01M 4/5825; H01M 4/587; H01M 4/625; H01M 10/052; H01M 10/0525; H01M 2220/20; Y02T 10/7011
See application file for complete search history.

(56) References Cited

U.S. PATENT DOCUMENTS

| 7,935,270 | B2 | 5/2011 | Park |
| 2005/0208346 | A1 | 9/2005 | Moon et al. |
| 2006/0147799 | A1 | 7/2006 | Hayashi et al. |
| 2008/0274406 | A1 | 11/2008 | Fuse et al. |
| 2008/0311432 | A1 | 12/2008 | Park et al. |
| 2011/0262809 | A1 | 10/2011 | Kumagai et al. |
| 2011/0311872 | A1 | 12/2011 | Oh et al. |
| 2012/0156560 | A1 | 6/2012 | Hong et al. |
| 2013/0084492 | A1 | 4/2013 | Yanagita et al. |
| 2013/0221283 | A1 | 8/2013 | Oh et al. |

FOREIGN PATENT DOCUMENTS

| CN | 1981393 | A | 6/2007 |
| CN | 102694195 | A | 9/2012 |
| CN | 202564476 | U | 11/2012 |
| JP | H05290844 | A | 11/1993 |
| JP | 2004273424 | A | 9/2004 |
| JP | 2007317538 | A | 12/2007 |
| JP | 2011228293 | A | 11/2011 |
| JP | 2013077421 | A | 4/2013 |
| JP | 2013089522 | A | 5/2013 |
| KR | 20080031616 | A | 4/2008 |
| KR | 20080109298 | A | 12/2008 |
| KR | 101113074 | B1 | 2/2012 |
| KR | 101139972 | B1 | 4/2012 |
| KR | 10-1199915 | * | 11/2012 |
| KR | 101199915 | B1 | 11/2012 |
| TW | I257728 | B | 7/2006 |
| WO | 2012138127 | A2 | 10/2012 |

OTHER PUBLICATIONS

Supplementary European Search Report for Application No. EP14807757 dated Jan. 3, 2017.
International Search Report for Application No. PCT/KR2014/004986 dated Sep. 29, 2014.
Search Report from Chinese Application No. 201480007889.4, dated Oct. 10, 2016.

* cited by examiner

*Primary Examiner* — Laura S Weiner
(74) *Attorney, Agent, or Firm* — Lerner, David, Littenberg, Krumholz & Mentlik, LLP

(57) ABSTRACT

Disclosed herein is a lithium secondary battery including a positive electrode including lithium iron phosphate and layered lithium nickel manganese cobalt oxide as a positive electrode active material and a negative electrode including a negative electrode active material having a potential difference of 3.10 V or higher from the lithium iron phosphate at a point of 50% state of charge (SOC) afforded by the entirety of the lithium iron phosphate.

13 Claims, 5 Drawing Sheets

SECONDARY BATTERY

CROSS-REFERENCE TO RELATED APPLICATIONS

The present application is a national phase entry under 35 U.S.C. § 371 of International Application No. PCT/KR2014/004986 filed Jun. 5, 2014, which claims priority from Korean Application No. 10-2013-0064421 filed Jun. 5, 2013, all of which are hereby incorporated herein by reference.

TECHNICAL FIELD

The present invention relates to a lithium secondary battery including a positive electrode including lithium iron phosphate and layered lithium nickel manganese cobalt oxide as a positive electrode active material and a negative electrode including a negative electrode active material having a potential difference of 3.10 V or higher from the lithium iron phosphate at a point of 50% state of charge (SOC) afforded by the entirety of the lithium iron phosphate.

BACKGROUND ART

As mobile devices have been increasingly developed, and the demand for such mobile devices has increased, the demand for secondary batteries has also sharply increased as an energy source for the mobile devices. Among such secondary batteries is a lithium secondary battery having a high energy density, a high operation potential, a long cycle lifespan, and a low self discharge rate, which is now commercialized and widely used.

In addition, in recent years, with increased concerns about environmental problems, much research has been carried out into electric vehicles (EV) and hybrid electric vehicles (HEV), which are capable of substituting for vehicles using fossil fuel, such as gasoline and diesel oil, which cause air pollution. Nickel-metal hydride (Ni-MH) secondary batteries have been mainly used as a power source for the electric vehicles (EV) and the hybrid electric vehicles (HEV). On the other hand, much research has also been carried out into lithium secondary batteries having a high energy density, high discharge voltage, and high output stability, and some of the lithium secondary batteries are now commercialized.

A lithium secondary battery is configured to have a structure in which an electrode assembly, including a positive electrode and a negative electrode each having an active material applied to a current collector and a porous separator interposed between the positive electrode and the negative electrode, is impregnated with a non-aqueous electrolyte containing lithium salt.

A lithium cobalt oxide, a lithium manganese oxide, a lithium nickel oxide, or a lithium composite oxide is used as the positive electrode active material of the lithium secondary battery. Carbon is mainly used as the negative electrode active material of the lithium secondary battery. The use of a silicon compound or a sulfate compound as the negative electrode active material of the lithium secondary battery is also under consideration.

At the time of manufacturing a battery for vehicles requiring high power characteristics, it is increasingly necessary to use a positive electrode material that is capable of improving power in a low voltage range. Lithium iron phosphate ($LiFePO_4$) has a lower voltage range than a conventional positive electrode active material, such as a ternary material ($LiNiMnCoO_2$) or spinel manganese ($LiMn_2O_4$), which has been widely used.

For high power, amorphous carbon (hard carbon, soft carbon, etc.) has been used as the negative electrode active material of the secondary battery. For the amorphous carbon, however, operating voltage of a discharge terminal is high. In a case in which lithium iron phosphate is used as the positive electrode active material of the secondary battery, therefore, a power increase effect is not satisfied.

Therefore, there is a high necessity for technology that is capable of fundamentally solving the above problems.

DISCLOSURE

Technical Problem

The present invention has been made to solve the above problems and other technical problems that have yet to be resolved.

As a result of a variety of extensive and intensive studies and experiments to solve the problems as described above, the inventors of the present application have found that in a case in which a lithium secondary battery includes a positive electrode including lithium iron phosphate and layered lithium nickel manganese cobalt oxide as a positive electrode active material and a negative electrode including a negative electrode active material having a potential difference of 3.10 V or higher from the lithium iron phosphate, it is possible to improve power of a discharge terminal. The present invention has been completed based on these findings.

Technical Solution

In accordance with one aspect of the present invention, the above and other objects can be accomplished by the provision of a lithium secondary battery including a positive electrode including lithium iron phosphate and layered lithium nickel manganese cobalt oxide as a positive electrode active material and a negative electrode including a negative electrode active material having a potential difference of 3.10 V or higher from the lithium iron phosphate at a point of 50% state of charge (SOC) afforded by the entirety of the lithium iron phosphate.

The lithium secondary battery is configured to have a structure in which an electrode assembly, in which a separator is interposed between a positive electrode and a negative electrode, is impregnated with a non-aqueous electrolytic solution containing lithium salt.

The positive electrode is prepared, for example, by applying a positive electrode mixture including a positive electrode active material to a positive electrode current collector and drying the positive electrode mixture. The positive electrode mixture may further selectively include a binder, a conductive agent, and a filler as needed.

In general, the positive electrode current collector has a thickness of 3 to 500 μm. The positive electrode current collector is not particularly restricted so long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or plastic carbon. Alternatively, the positive electrode current collector may be made of aluminum or stainless steel, the surface of which is treated with carbon, nickel, titanium, or silver. In addition, the positive electrode current collector may have a micro uneven pattern formed at the surface thereof so as to increase adhesive force of the positive electrode active material. The positive electrode current collector may be configured in various forms, such as a film, a sheet, a foil, a net, a porous body, a foam body, and a non-woven fabric body.

The positive electrode active material is a material that is capable of inducing an electrochemical reaction. The positive electrode active material may be a transition metal oxide. According to the present invention, the lithium iron phosphate is used as the positive electrode active material. The lithium iron phosphate may be olivine-structured lithium iron phosphate represented by $LiFePO_4$.

The lithium iron phosphate exhibits low conductivity. For this reason, a conductive material may be coated on the surface of the lithium iron phosphate such that the lithium iron phosphate can be used as the positive electrode active material. Any electrically conductive material may be used as the conductive material. For example, the conductive material may be carbon or conductive polymer.

In addition, according to the present invention, the lithium secondary battery may include the layered lithium nickel manganese cobalt oxide represented by the following formula in addition to the lithium iron phosphate.

$$Li_{1+z}Ni_bMn_cCo_{1-(b+c+d)}M_dO_{(2-e)}A_e$$

where $-0.5 \leq z \leq 0.5$, $0.6 \leq b \leq 0.9$, $0.05 \leq c \leq 0.35$, $0 \leq d \leq 0.2$, $0 \leq e \leq 0.2$, $b+c+d<1$, M=Al, Mg, Cr, Ti, Si, or Y, and A=F, P, or Cl.

Generally, in a case in which the content of nickel with respect to the other transition metals is 0.6 or more, the amount of nickel cations ($Ni^{2+}$) is relatively increased. In this case, the amount of electric charges that are capable of moving lithium ions is increased with the result that the lithium secondary battery may have a high capacity.

For the lithium nickel-based oxide, however, the content of $Ni^{2+}$ during firing is increased as the amount of Ni is increased with the result that oxygen is excessively dissociated at a high temperature. That is, the crystalline structure of the lithium nickel-based oxide exhibits low stability. For this reason, it is not preferable for the content of nickel to exceed 0.9.

In a concrete example, the lithium iron phosphate and the lithium nickel manganese cobalt oxide may be mixed at a ratio in weight percent of 30:70 to 5:95, specifically 20:80 to 5:95.

In a case in which the content of the lithium iron phosphate is higher than 30%, overall energy density of the lithium secondary battery is considerably reduced due to the lithium iron phosphate, which has a relatively small affordable capacity. For this reason, the lithium secondary battery is not preferable for a battery for vehicles which is required to output maximum energy in a limited space. On the other hand, in a case in which the content of the lithium iron phosphate is lower than 10%, a power assistance effect at a low SOC region according to addition of the lithium iron phosphate is not great, which is not preferable.

The conductive agent is generally added such that the conductive agent has 1 to 30% by weight based on the total weight of the mixture including the positive electrode active material. The conductive agent is not particularly restricted so long as the conductive agent exhibits high conductivity while the conductive agent does not induce any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive agent.

The binder is a component assisting in binding between the active material and conductive agent and in binding with the current collector. The binder is generally added in an amount of 1 to 30% by weight based on the total weight of the mixture including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the electrode. There is no particular limit to the filler so long as the filler is made of a fibrous material while the filler does not cause chemical changes in a battery to which the filler is applied. As examples of the filler, there may be used olefin polymers, such as polyethylene and polypropylene; and fibrous materials, such as glass fiber and carbon fiber.

On the other hand, the negative electrode is prepared, for example, by applying a negative electrode mixture including a negative electrode active material to a negative electrode current collector and drying the negative electrode mixture. The conductive agent, the binder, and the filler, which were previously described, may be selectively added to the negative electrode mixture as needed.

In general, the negative electrode current collector has a thickness of 3 to 500 μm. The negative electrode current collector is not particularly restricted so long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or plastic carbon. Alternatively, the negative electrode current collector may be made of copper or stainless steel, the surface of which is treated with carbon, nickel, titanium, or silver, or an aluminum-cadmium alloy. In the same manner as in the positive electrode current collector, the negative electrode current collector may have a micro uneven pattern formed at the surface thereof so as to increase adhesive force of the negative electrode active material. The negative electrode current collector may be configured in various forms, such as a film, a sheet, a foil, a net, a porous body, a foam body, and a non-woven fabric body.

The negative electrode active material is not particularly restricted so long as the potential difference between the negative electrode active material and the lithium iron phosphate has a range of 3.10 V to 3.30 V.

In a case in which the potential difference between the negative electrode active material and the lithium iron phosphate is lower than 3.10 V, it is not possible to secure a high operating voltage, whereby it is not possible to improve power of a terminal region during discharge of the lithium secondary battery, which is not preferable. For this reason, it is more preferable for the potential difference to have a range of 3.10 V to 3.30 V at a point of 50% state of charge (SOC) afforded by the entirety of the lithium iron phosphate.

As a concrete example of the negative electrode active material that is capable of satisfying the above conditions, the negative electrode active material may be a graphite-based material. The graphite-based material may consist of natural graphite alone.

On the other hand, the graphite-based material may be a mixture of natural graphite and artificial graphite.

In a case in which the natural graphite and the artificial graphite are mixed, orientation of the lithium secondary battery due to the expansion in volume of the lithium secondary battery is restrained, thereby providing negative electrode characteristics suitable for a battery for vehicles that requires a long lifespan. In order to obtain such an effect, the artificial graphite may be contained in an amount of 20% by weight or less based on the total weight of the mixture. Specifically, the artificial graphite may be contained in an amount of 5% by weight to 20% by weight based on the total weight of the mixture.

In addition, the inventors of the present application have found that in a case in which more than 20% by weight of artificial graphite is added, an effect of restraining orientation of the lithium secondary battery due to the expansion in volume of the lithium secondary battery is not considerably improved while manufacturing efficiency is greatly lowered. As a result, it is difficult to manufacture a negative electrode exhibiting high efficiency.

In addition, the graphite-based material may have an average particle diameter (D50) of 5 μm to 30 μm. In a case in which the particle diameter of the graphite-based material is less than 5 μm, fine powder is increased with the result that it is difficult to form the electrode. On the other hand, in a case in which the particle diameter of the graphite-based material is more than 30 μm, power of the lithium secondary battery is considerably lowered, which is not preferable.

Meanwhile, the graphite-based material may be coated with amorphous carbon. For graphite-based material having a surface coated with amorphous carbon, side reaction of the surface due to the electrolytic solution is restrained as compared with graphite-based material which is not coated with amorphous carbon. As a result, initial efficiency of the lithium secondary battery is improved, and stable lifespan characteristics of the lithium secondary battery are achieved. In addition, the coating on the surface of the graphite-based material performs a function similar to the conductive agent, thereby improving power of the lithium secondary battery.

The binder, the conductive agent, and other components added as needed are identical to those described in connection with the positive electrode.

According to circumstances, the filler is an optional component used to inhibit expansion of the negative electrode. There is no particular limit to the filler so long as the filler is made of a fibrous material while the filler does not cause chemical changes in a battery to which the filler is applied. As examples of the filler, there may be used olefin polymers, such as polyethylene and polypropylene; and fibrous materials, such as glass fiber and carbon fiber.

In addition, other components, such as a viscosity controlling agent and an adhesion promoter, may be further included selectively or as a combination of two or more components.

The viscosity controlling agent is a component for controlling the viscosity of the electrode mixture so as to facilitate mixing of the electrode mixture and coating thereof on the current collector. The viscosity controlling agent may be added in an amount of up to 30% by weight based on the total weight of the negative electrode mixture. Examples of the viscosity controlling agent include, without being limited to, carboxymethylcellulose and polyvinylidene fluoride. However, the present invention is not limited thereto. According to circumstances, the above-described solvent may also function as the viscosity controlling agent.

The adhesion promoter is an auxiliary component added to enhance adhesion between the electrode active material and the electrode current collector. The adhesion promoter may be added in an amount of 10% by weight or less based on the amount of the binder. Examples of the adhesion promoter include, without being limited to, oxalic acid, adipic acid, formic acid, acrylic acid derivatives, and itaconic acid derivatives.

The separator is disposed between the positive electrode and the negative electrode. An insulative thin film exhibiting high ion permeability and high mechanical strength may be used as the separator. The separator generally has a pore diameter of 0.01 to 10 μm and a thickness of 5 to 300 μm. A sheet or non-woven fabric made of olefin polymer, such as polypropylene, which exhibits chemical resistance and hydrophobicity, glass fiber, or polyethylene is used as the material for the separator. In a case in which a solid electrolyte, such as polymer, is used as the electrolyte, the solid electrolyte may also function as the separator.

The non-aqueous electrolytic solution containing lithium salt is composed of an electrolytic solution and lithium salt. A non-aqueous organic solvent, an organic solid electrolyte, or an inorganic solid electrolyte may be used as the electrolytic solution.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the above-mentioned non-aqueous electrolyte. The lithium salt may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolytic solution. According to circumstances, in order to impart incombustibility, the electrolytic solution may further include halogen-containing solvents, such as carbon tetrachloride and ethylene trifluoride. Furthermore, in order to improve high-temperature retention characteristics, the electrolytic solution may further include carbon dioxide gas. In addition, fluoro-ethylene carbonate (FEC) and propene sultone (PRS) may be further included.

In a preferred example, lithium salt, such as $LiPF_6$, $LiClO_4$, $LiBF_4$, or $LiN(SO_2CF_3)_2$, may be added to a mixed solvent of cyclic carbonate, such as EC or PC, which is a high dielectric solvent, and liner carbonate, such as DEC, DMC, or EMC, which is a low viscosity solvent to prepare a non-aqueous electrolyte containing lithium salt.

In accordance with other aspects of the present invention, there are provided a battery module including the lithium secondary battery as a unit cell and a battery pack including the battery module.

The battery pack may be used as a power source of a device requiring stability against high temperature, long cycle and high rate characteristics, etc.

In a preferred example, the device may be a mobile electronic device, a power tool driven by a battery-based motor, an electric automobile, such as such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, or a power storage system. However, the present invention is not limited thereto.

BRIEF DESCRIPTION OF DRAWINGS

The above and other objects, features and other advantages of the present invention will be more clearly understood from the following detailed description taken in conjunction with the accompanying drawings, in which.

BEST MODE

Now, the present invention will be described in more detail with reference to the following examples. These examples are provided only for illustration of the present invention and should not be construed as limiting the scope of the present invention.

Example 1

90% by weight of a mixture of $LiFePO_4$ having carbon as a conductive material coated on the surface thereof and $LiNi_{0.6}Mn_{0.2}Co_{0.2}O_2$ as lithium nickel manganese cobalt oxide mixed at a ratio in weight percent of 15:85 as a positive electrode active material, 5% by weight of Super-P (a conductive agent), and 5% by weight of PVdF (a binder) were added to NMP to prepare a positive electrode mixture slurry. Subsequently, the positive electrode mixture slurry was coated, dried, pressed over one surface of aluminum foil to manufacture a positive electrode.

96% by weight of a mixture of natural graphite coated with amorphous carbon and artificial graphite mixed at a ratio in weight percent of 95:5 as a negative electrode active material, 1% by weight of Super-P (a conductive agent), 2% by weight of SBR (a binder), and 1% by weight of a viscosity agent were added to a solvent, e.g. $H_2O$, to prepare a negative electrode mixture slurry. Subsequently, the negative electrode mixture slurry was coated, dried, pressed over one surface of copper foil to manufacture a negative electrode.

A lithium secondary battery was manufactured using the positive electrode and the negative electrode manufactured as described above and a carbonate electrolyte.

Example 2

A lithium secondary battery was manufactured in the same manner as in example 1 except that a mixture of $LiFePO_4$ and $LiNi_{0.6}Mn_{0.2}Co_{0.2}O_2$ mixed at a ratio in weight percent of 10:90 was used as a positive electrode active material.

Example 3

A lithium secondary battery was manufactured in the same manner as in example 1 except that a mixture of $LiFePO_4$ and $LiNi_{0.6}Mn_{0.2}Co_{0.2}O_2$ mixed at a ratio in weight percent of 20:80 was used as a positive electrode active material.

Example 4

A lithium secondary battery was manufactured in the same manner as in example 1 except that a mixture of $LiFePO_4$ and $LiNi_{0.6}Mn_{0.2}Co_{0.2}O_2$ mixed at a ratio in weight percent of 5:95 was used as a positive electrode active material.

Comparative Example 1

A lithium secondary battery was manufactured in the same manner as in example 1 except that a mixture of natural graphite and amorphous carbon mixed at a ratio in weight percent of 90:10 was used as a negative electrode active material instead of natural graphite and artificial graphite of example 1.

Comparative Example 2

A lithium secondary battery was manufactured in the same manner as in example 1 except that a mixture of $LiFePO_4$ and lithium nickel manganese cobalt oxide mixed at a ratio in weight percent of 40:60 was used as a positive electrode active material.

Comparative Example 3

A lithium secondary battery was manufactured in the same manner as in example 1 except that $LiNi_{0.6}Mn_{0.2}Co_{0.2}O_2$ as lithium nickel manganese cobalt oxide alone was used as a positive electrode active material.

Example 5

A lithium secondary battery was manufactured in the same manner as in example 1 except that a mixture of natural graphite and artificial graphite mixed at a ratio in weight percent of 90:10 was used as a negative electrode active material.

Example 6

A lithium secondary battery was manufactured in the same manner as in example 1 except that a mixture of natural graphite and artificial graphite mixed at a ratio in weight percent of 95:5 was used as a negative electrode active material.

Example 7

A lithium secondary battery was manufactured in the same manner as in example 1 except that natural graphite alone was used as a negative electrode active material.

Comparative Example 4

A lithium secondary battery was manufactured in the same manner as in example 3 except that Ni, Mn, and Co of lithium nickel manganese cobalt oxide used as a positive electrode active material were contained at a content ratio of 1:1:1.

Comparative Example 5

A lithium secondary battery was manufactured in the same manner as in example 1 except that natural graphite not coated with amorphous carbon was used as a negative electrode active material instead of the natural graphite of example 1.

Experimental Example 1

Potential differences between the positive electrodes and the negative electrodes of the lithium secondary batteries manufactured according to example 1 and comparative example 1 were measured. The results are shown in FIG. 1.

Figure 1:
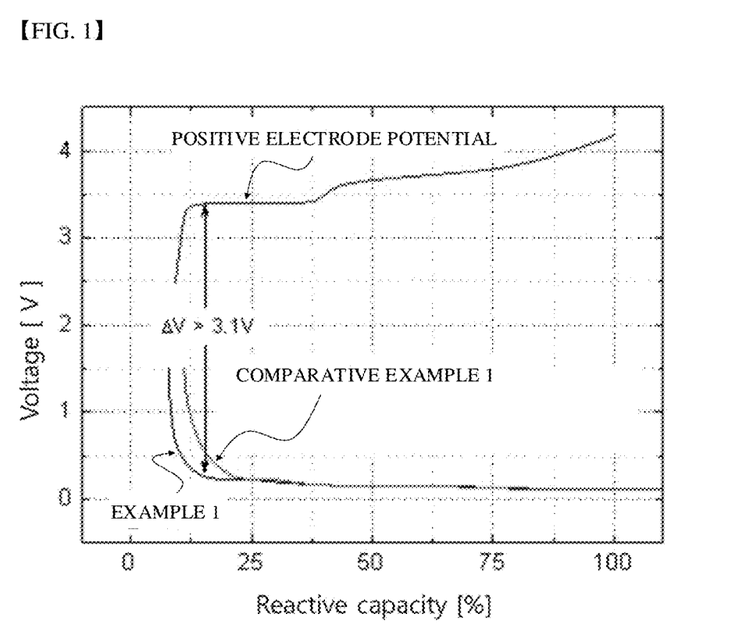
FIG. 1 is a graph showing a potential difference between a positive electrode active material and a graphite-based negative electrode active material in experimental example 1 according to the present invention.

It can be seen from FIG. 1 that the battery of example 1 has a range of 3.10 V to 3.30 V at a point of SOC, thereby securing high operating voltage and thus improving power of a terminal region during discharge of the battery as compared with the battery of comparative example 1.

Experimental Example 2

Formation of the batteries manufactured according to examples 1, 2, 3, and 4 and comparative examples 2 and 3 was carried out at 4.2 V, and then power changes of the batteries over the entire regions of SOC were measured. The results are shown in FIG. 2.

Figure 2:
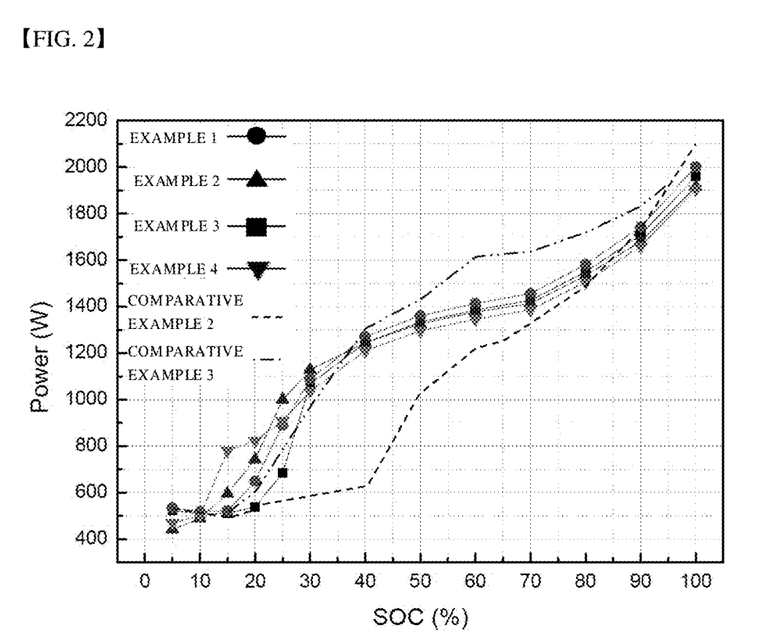
FIG. 2 is a graph showing a comparison in power characteristics among batteries manufactured according to examples 1, 2, 3, and 4 and comparative examples 2 and 3 in experimental example 2 according to the present invention.

It can be seen from FIG. 2 that the batteries of examples 1, 2, 3, and 4 have higher powers than those of comparative examples 2 and 3.

Experimental Example 3

Formation of the batteries manufactured according to examples 5, 6, and 7 was carried out at 4.2 V, and then power changes of the batteries over the entire regions of SOC were measured. The results are shown in FIG. 3.

Figure 3:
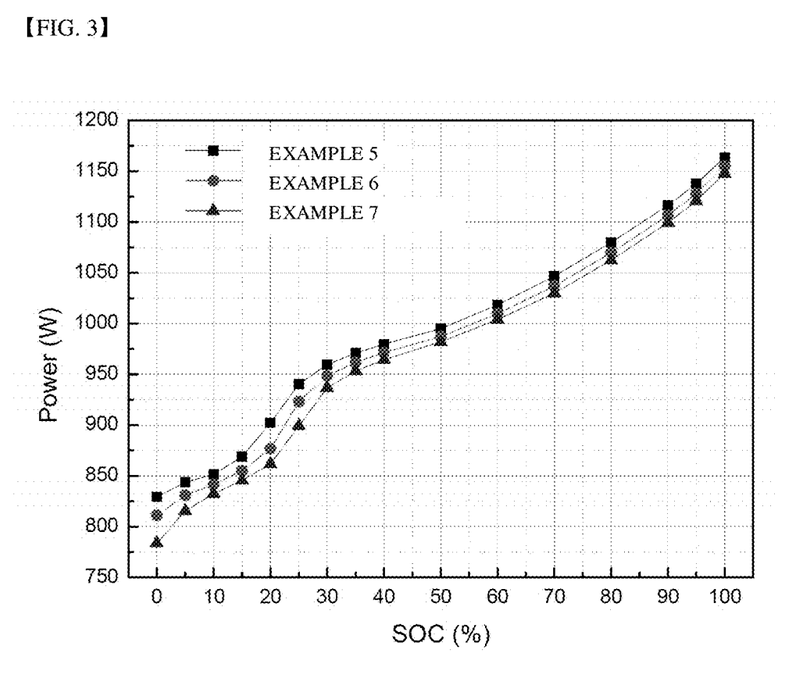
FIG. 3 is a graph showing power characteristics of batteries manufactured according to examples 5, 6, and 7 in experimental example 3 according to the present invention.

It can be seen from FIG. 3 that discharge power characteristics of the batteries of examples 5, 6, and 7 are improved with the increase in content of artificial graphite.

Experimental Example 4

Formation of the batteries manufactured according to example 1 and comparative example 4 was carried out at 4.2 V, and then power changes of the batteries over the entire regions of SOC were measured. The results are shown in FIG. 4.

Figure 4:
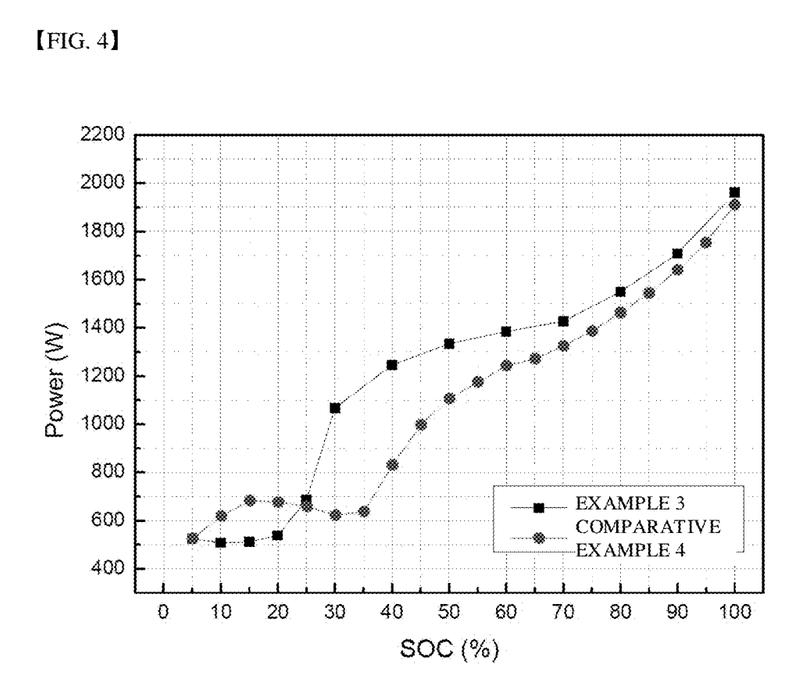
FIG. 4 is a graph showing a comparison in power characteristics between batteries manufactured according to example 1 and comparative example 4 in experimental example 4 according to the present invention.

It can be seen from FIG. 4 that the battery of example 1 has a higher power than that of comparative example 4.

Experimental Example 5

The lithium secondary batteries manufactured according to example 1 and comparative example 5 were charged and discharged for 500 cycles, and then capacities of the batteries were measured. The results are shown in FIG. 5.

Figure 5:
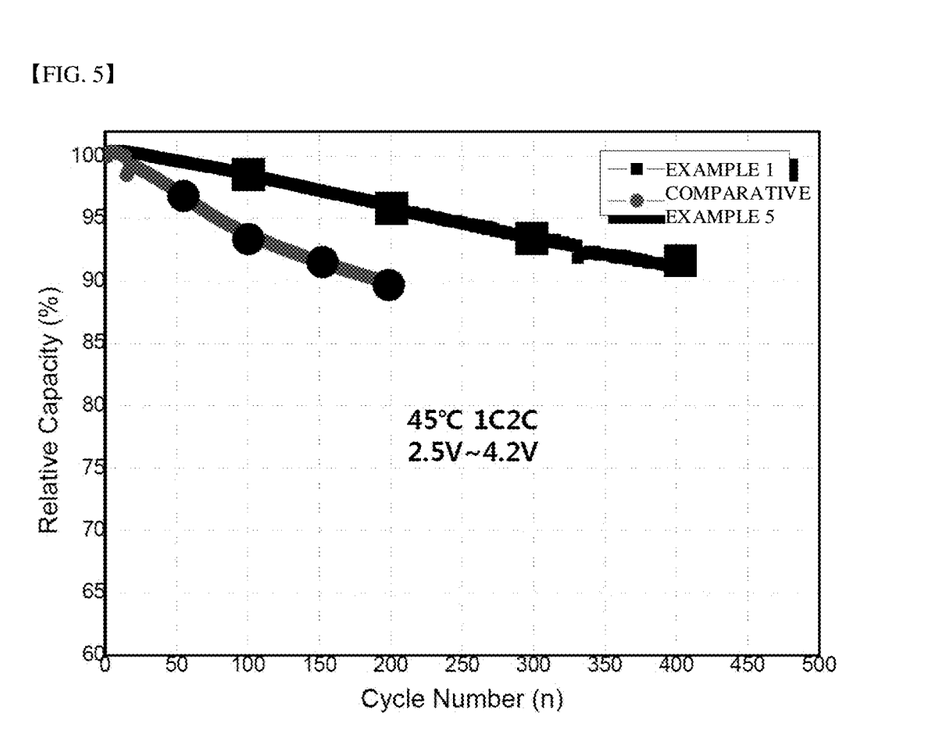
FIG. 5 is a graph showing a comparison in cycle characteristics between batteries manufactured according to example 1 and comparative example 5 in experimental example 5 according to the present invention.

It can be seen from FIG. 5 that sudden lowering in performance of the battery manufactured according to example 1 due to charge and discharge of the battery is prevented as compared with the battery of comparative example 5 since the negative electrode active material of the battery manufactured according to example 1 includes natural graphite coated with amorphous carbon.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a lithium secondary battery according to the present invention includes a negative electrode including a negative electrode active material having a potential difference of 3.10 V or higher from lithium iron phosphate at a point of 50% state of charge (SOC) afforded by the entirety of the lithium iron phosphate. Consequently, the present invention has the effect of securing high operating voltage, thereby improving power of a discharge terminal.

The invention claimed is:
1. A lithium secondary battery comprising:
   a positive electrode comprising lithium iron phosphate and layered lithium nickel manganese cobalt oxide as a positive electrode active material; and
   a negative electrode comprising a negative electrode active material having a potential difference of 3.10 V or higher from the lithium iron phosphate at a point of 50% state of charge (SOC) afforded by the entirety of the lithium iron phosphate,
   wherein the negative electrode active material is a graphite-based material, and the graphite-based material includes natural graphite coated with amorphous carbon, and
   wherein the lithium iron phosphate and the lithium nickel manganese cobalt oxide are mixed at a ratio in weight percent of 20:80 to 5:95.
2. The lithium secondary battery according to claim 1, wherein the lithium iron phosphate is olivine-structured lithium iron phosphate.

3. The lithium secondary battery according to claim 1, wherein the lithium iron phosphate has a conductive material coated on a surface thereof.

4. The lithium secondary battery according to claim 1, wherein the layered lithium nickel manganese cobalt oxide is represented by the following formula:

$$Li_{1+z}Ni_bMn_cCo_{1-(b+c+d)}M_dO_{(2-e)}A_e$$

where $-0.5 \leq z \leq 0.5$, $0.6 \leq b \leq 0.9$, $0.05 \leq c \leq 0.35$, $0 \leq d \leq 0.2$, $0 \leq e \leq 0.2$, $b+c+d<1$, M=Al, Mg, Cr, Ti, Si, or Y, and A=F, P, or Cl.

5. The lithium secondary battery according to claim 1, wherein the potential difference has a range of 3.10 V to 3.30 V.

6. The lithium secondary battery according to claim 1, wherein the graphite-based material further comprises artificial graphite.

7. The lithium secondary battery according to claim 6, wherein the artificial graphite is contained in an amount of 20% by weight or less based on the total weight of the natural graphite coated with amorphous carbon and the artificial graphite.

8. The lithium secondary battery according to claim 7, wherein the artificial graphite is contained in an amount of 5% by weight to 20% by weight based on the total weight of the natural graphite coated with amorphous carbon and the artificial graphite.

9. The lithium secondary battery according to claim 1, wherein the natural graphite has an average particle diameter (D50) of 5 μm to 30 μm.

10. A battery module comprising a lithium secondary battery according to claim 1 as a unit cell.

11. A battery pack comprising a battery module according to claim 10.

12. A device comprising a battery pack according to claim 11.

13. The device according to claim 12, wherein the device is an electric vehicle, a hybrid electric vehicle, a plug-in hybrid electric vehicle, or a power storage system.

* * * * *